United States Patent
Kawano et al.

(10) Patent No.: US 6,780,255 B2
(45) Date of Patent: Aug. 24, 2004

(54) SM-FE-N BASED ALLOY POWDER AND PROCESS FOR PRODUCING THE SAME

(75) Inventors: Yohsiyuki Kawano, Anan (JP); Michiya Kume, Anan (JP); Keiji Ichinomiya, Anan (JP)

(73) Assignee: Nichia Chemical Industries, Ltd., Tokushima (JP)

(*) Notice: Subject to any disclaimer, the term of this patent is extended or adjusted under 35 U.S.C. 154(b) by 81 days.

(21) Appl. No.: 09/987,064

(22) Filed: Nov. 13, 2001

(65) Prior Publication Data

US 2002/0029824 A1 Mar. 14, 2002

Related U.S. Application Data

(62) Division of application No. 09/582,293, filed as application No. PCT/JP98/05846 on Dec. 24, 1998, now Pat. No. 6,334,908.

(30) Foreign Application Priority Data

Dec. 25, 1997 (JP) .......................... P 9-356409
Nov. 25, 1998 (JP) ......................... P 10-334679

(51) Int. Cl.$^7$ ............................... H01F 1/059
(52) U.S. Cl. .................... 148/122; 148/101; 148/102; 148/105; 75/348; 75/350; 75/351; 75/357; 75/359; 75/360; 75/363; 75/364; 75/365
(58) Field of Search ................ 148/101, 102, 148/105, 122; 75/348, 350, 351, 357, 359, 360, 363, 364, 365

(56) References Cited

U.S. PATENT DOCUMENTS

| | | | |
|---|---|---|---|
| 4,681,623 A | | 7/1987 | Okajima et al. |
| 5,395,459 A | * | 3/1995 | Pinkerton et al. ........... 148/101 |
| 5,482,572 A | | 1/1996 | Eggert et al. |

FOREIGN PATENT DOCUMENTS

| | | |
|---|---|---|
| EP | 0 417 733 | 3/1991 |
| JP | 61-295308 | 12/1986 |
| JP | 63-105909 | 5/1988 |
| JP | 5-148517 | 6/1993 |
| JP | 5-175023 | 7/1993 |
| JP | 5-279714 | 10/1993 |
| JP | 5-315174 | 11/1993 |
| JP | 6-81010 | 3/1994 |
| JP | 6-151127 | 5/1994 |
| JP | 6-212342 | 8/1994 |
| JP | 6-346101 | 12/1994 |
| JP | 7-50648 | 5/1995 |
| JP | 8-188803 | 7/1996 |
| JP | 11-241104 | * 9/1999 |
| JP | 2000-104104 | * 4/2000 |

OTHER PUBLICATIONS

English Language Translation of Japanese Patent Document No. 08–188803 A, Jul. 23, 1996.*
P.A.P. Webdhausen et al., "Effect of milling on the magnetic and microstructural properties of $Sm_2Fe_{17}N_x$ permanent magnets", Journal of Applied Physics, vol. 75, No. 10, Part 02A, May 15, 1994, pp. 6018–6020.

* cited by examiner

Primary Examiner—John P. Sheehan
(74) Attorney, Agent, or Firm—Morrison & Foerster LLP

(57) ABSTRACT

A magnetic powder of an Sm—Fe—N alloy, which has a mean particle diameter of 0.5 to 10 $\mu$m, and either an average acicularity of 75% or above or an average sphericity of 78% or above. The powder exhibits an extremely high residual magnetization and an extremely high coercive force, since particles characterized by the above acicularity or sphericity have particle diameters approximately equal to that of the single domain particle and nearly spherical particle shapes. The powder can be produced by preparing an Sm—Fe oxide by firing a coprecipitate corresponding to the oxide, mixing the obtained oxide with metallic calcium and subjecting the mixture to reduction/diffusion and nitriding successively.

11 Claims, 4 Drawing Sheets

Degree of needle shape = $\dfrac{b}{a} \times 100\,(\%)$

Degree of roundness = $\dfrac{4 \cdot \pi \cdot S}{L^2} \times 100\,(\%)$

SM-FE-N BASED ALLOY POWDER AND PROCESS FOR PRODUCING THE SAME

This application is a division of application Ser. No. 09/582,293, filed Jun. 23, 2000, now U.S. Pat. No. 6,334,908.

TECHNICAL FIELD

The present invention relates powder of alloy containing a rare earth element Sm, a transition metal Fe, and nitrogen, and, more particularly, to such alloy powder having a spherical shape with superior magnetic properties.

BACKGROUND OF THE INVENTION

In recent years, there have been ever-increasing demands for rare earth-transition metal based magnetic materials because of their superior magnetic properties, in spite of the fact that they are very expensive as compared with ferrite, etc. Among these, since Nd-based magnets have particularly high magnetic properties as compared with Sm-based magnets, and are inexpensive, they have come to be mainly used among rare earth magnets.

Here, R—Fe—N based alloys have been known, which are formed by nitriding R—Fe based alloys that are rare earth-transition metal based magnetic materials. Magnets of this type have been developed extensively since they have superior characteristics, including possibility of higher coercive force as compared with R—Fe—B based materials resulting from high Curie Points not less than 150° C., high stability with small temperature variations in magnetic properties and high weather resistance.

R—Fe—N based alloys are manufactured in the form of powder, molded into a desired shape in combination with a filler, and then utilized as bonded magnets. Although alloy powder of this type exerts a high anisotropic magnetic field, a molded magnet made from the alloy powder of this type is difficult to obtain a high coercive force. In order to obtain a high coercive force, the magnet needs to be finely pulverized, or utilized as a metal bonded magnet containing a metal like Zn as a binder. In the case of the finely pulverized magnet alloy, the particles are oxidized, or subjected to distortion or residual stress, resulting in degradation in other magnetic properties, e.g., a reduction in residual magnetization. In the case of the metal bonded magnet, this method is considerably expensive as compared with plastic binding used in normal bonded magnets, impossible to provide practical applications.

Magnetic alloy powder has an inherent mono-magnetic domain size, and it has been known that magnetic powder whose particle size is set closer to this mono-magnetic domain size can show a maximum coercive force. For magnetic materials containing a rare earth element and a transition metal, the mono-magnetic domain size is several micrometers. Therefore, to improve magnetic properties of alloy powder serving as a magnetic material, it is essential to provide a process for forming fine particles.

With respect to the process for a magnetic material containing a rare earth element and a transition metal, a reduction-diffusion method has been known in which a mixture of powders of a rare earth metal oxide and a transition metal with metal calcium is heated in an inert gas atmosphere so that the rare earth oxide is reduced to metal and transferred into the transition metal, to form an alloy (see Japanese Patent Publication Nos. JP-A61-295308, JP-A5-148517, JP-A5279714 and No. JP-A6-81010). This reduction-diffusion method is advantageous in that an inexpensive rare earth oxide may be used and alloued simultaneously with the reducing process. This method has been widely used in manufacturing an intermetallic compound $SmCo_5$ or an Sm—Co alloy used for permanent magnets. Moreover, in the case where the abovementioned R—Fe—N based alloy powder is manufactured, after the R—Fe alloy has been reduced by this method, the reduced alloy is subjected to a nitrding process to form magnetic powder of an R—Fe—N based alloy.

In this reduction-diffusion method, an oxide of a rare earth element having a particle size of not more than several micrometers is used as a material, and the particle size of the magnetic powder obtained after reduction becomes smaller to a certain degree; however, this method is still not sufficient to provide fine magnetic powder corresponding to the mono-magnetic domain size. This is because the particle size of a material iron-based metal is quite large as compared with that of the rare earth element oxide. Therefore, conventionally, this reduced powder is nitrided, and then finely pulverized to the mono-magnetic domain size so as to exert a sufficient coercive force; thereafter, formed into a bonded magnet, whereas the resulting bonded magnet exhibits only a low residual magnetization.

For bonded magnets, when its magnet particles are provided as fine particles, its filling rate becomes low, resulting in a limitation in the density of the magnetic powder contained in its molded body. Moreover, when the bonded magnet is oriented toward a magnetic field applied, the distorted shape of the fine particles after pulverization makes it difficult to align the fine particles in a direction of easy magnetization axis toward the magnetic field, resulting in degradation in degree of alignment and degree of orientation.

DISCLOSURE OF THE INVENTION

An objective of the present invention is to provide powder of an Sm—Fe—N based alloy having high magnetic performances, in particular, a high coercive force by optimizing a particle size and shape of the alloy powder.

Another objective of the present invention is to provide a method for manufacturing powder of an Sm—Fe—N based alloy having high magnetic performances, in particular, a high coercive force, without the need for a mechanical method such as a finely pulverizing process.

In the present invention, Sm—Fe—N based alloy particles are finely divided to approximate a particle size to its mono-magnetic domain size or the vicinity thereof, and are simultaneously provided with a spherical shape, so that, when magnetizing bonded magnet toward a magnetic field, the fine particles can increase in degree of orientation in a direction of its easy magnetization, thereby increasing in coercive force.

In particular, in the Sm—Fe—N based magnetic powder of the present invention, the alloy powder is set to have an average particle size in the range of 0.5 to 10 $\mu$m. Moreover, the magnetic powder is set to have an average degree of needle shape of not less than 75% in approximation of the spherical particles. In the present description, an average degree of needle shape is provided as an average of the degrees of needle shape of the individual particles which is defined by the following equation:

Degree of needle shape=$(b/a) \times 100(\%)$ where a represents the longest diameter on a projection image of a particle, and b represents the largest diameter vertical to the a of the particle. In particular, a shows the longest length on a particle image projected on a plane and b is the largest size vertical to the a on the same projection.

In addition to the average particle size in the range of 0.5 to 10 μm, the Sm—Fe—N based magnetic powder of the present invention is set to have an average degree of roundness of not less than 78% as means for estimating the spherical particles. Here, the average degree of roundness is obtained as an average of values of roundness of the respective particles defined by the following equation:

Degree of roundness=$(4\pi S/L) \times 100$(%)

Here, S and L represent an area of a particle projection and a peripheral length of the outline of the particle image, respectively, which are measured on the particle image projected on the plane.

The process for producing Sm—Fe—N based magnetic powder of the present invention uses a combination of reduction-diffusion technique of a metal oxide and nitriding technique, in which not less than half or all of the Fe source of a starting material for an Sm—Fe based alloy is prepared as iron oxide, and a mixture of the iron oxide with samarium oxide is reduced by a metallic reducing agent such as Ca. Thus, alloy particles having a shape distribution close to spherical shape are obtained. The magnetic powder obtained by nitriding the alloy particles has a spherical shape or a similar shape to a spherical shape, allowing the particles to easily rotate in a magnetic field direction when they are magnetized in a resin bond. In this manner, the frequency of orientation of each magnetic particle toward the applied magnetic field is increased so that the magnetic particles in a bonded magnet are easily magnetized.

In the present invention, from the fact that in the reduction-diffusion method, the size of reduced particles is greatly dependent on the particle size of the material particles, oxide powder having fine particles may be used as starting material particles.

For this purpose, the present invention may preferably use a mixture of oxide particles of iron oxide and samarium oxide obtained through a co-precipitation method as a starting material. In other words, a precipitation of the mixture of iron oxide and samarium oxide is obtained by the co-precipitation method from a solution in the present of Fe and Sm co-existing, and decomposed and oxidized through calcination or another method to produce an oxide, and this oxide is available. In the present invention, the co-precipitation method and calcination achieve a high degree of a mixed state between Fe and Sm, and provide very fine oxide particles having a spherical shape; thus, the resulting magnetic powder is reduced and diffused which have a size and a degree of needle shape similar to those of the material oxide particles.

The method of the present invention further may include a process in which the oxide from the co-precipitation method is partially reduced preliminarily, so that the material powder, preliminarily reduced, can be more easily reduced and diffused by the metallic reducing agent such as Ca as described above. In the preliminary reduction, a gas reducing process using hydrogen, etc. may be used, and the resulting mixture, part of the oxide of which has been reduced, contains metal iron, iron oxide and samarium oxide, and is used for reduction and diffusion.

BRIEF DESCRIPTION OF THE DRAWINGS

Referring to the following attached drawings, the present invention will be discussed in detail.

BEST MODES FOR CARRYING OUT THE INVENTION

Alloy powder having a composition of $Sm_2Fe_{17}N_3$ is mainly used with respect to Sm—Fe—N based magnetic powder of the present invention. In particular, the alloy powder includes a nitride having a compound composition having 15 to 20 Fe atoms and 1 to 4 N atoms with respect to 2 Sm atoms.

Alloy powder having an average particle size in the range of 0.5 to 10 μm may be used as the Sm—Fe—N based magnetic powder of the present invention. In particular, the range of the average particle size may preferably be set from 0.5 μm to 4 μm, more preferably from 0.6 μm to 3.5 μm to increase the coercive force, and most preferably set from 0.7 μm to 3 μm, so as to further increase the coercive force.

Figure 3:
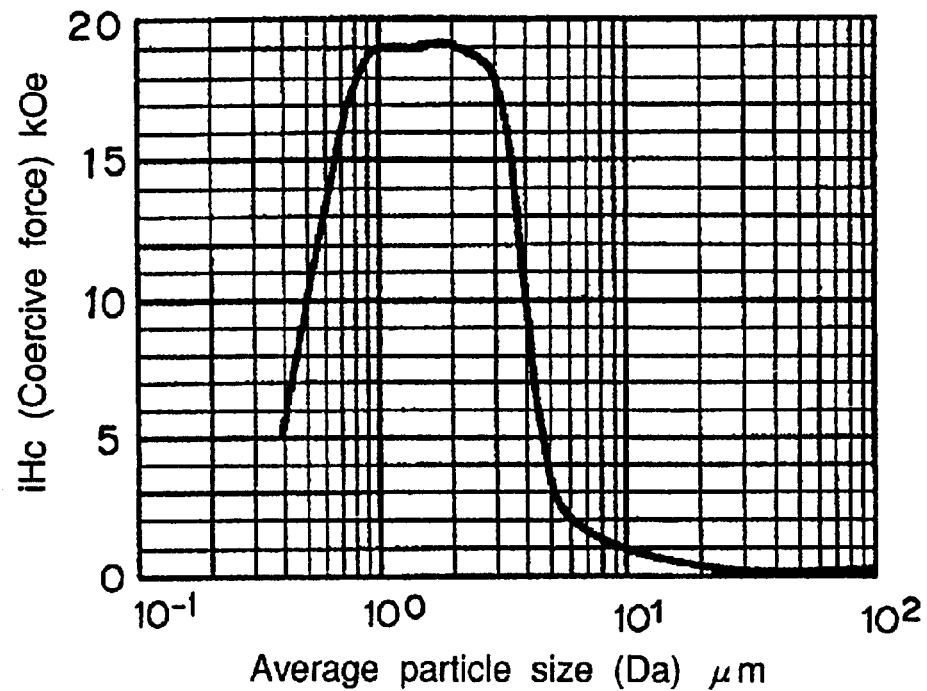
FIG. 3 is a graph that shows the relationship between coercive force and average particle size of powder of $Sm_2Fe_{17}N_3$ alloy.

In the Sm—Fe—N based magnetic powder having the composition of $Sm_2Fe_{17}N_3$, FIG. 3 shows the relationship between average particle size (Da) of magnetic powder whose particle shape is substantially spherical (having not less than 95% in average degree of needle shape) and the coercive force of a bonded magnet formed by mixing such powder particles with a resin. The average particle size of the alloy particles shown here is determined as follows. First, the specific surface area of the powder is measured by using a Fischer subsieve sizer* through an air permeation method, and from the results of this, the average value of the particle size of the primary particles is found to be used as the particle size of the alloy particles. Magnetic measurements are carried out on bonded magnets formed from a number of samples having different particle sizes, and data on the average particle size and the average coercive force are plotted on FIG. 3.

FIG. 3 shows that $Sm_2Fe_{17}N_3$ based particles have the highest coercive force is in the vicinity of 1 to 2 μm of the average particle size, and in this example, the value is 19 kOe. The reason that this particle-size range provides the highest coercive force is because this particle size substantially approximates the mono-magnetic domain size of this alloy.

As the average particle size becomes smaller than this range, or greater than this range, the coercive force drops abruptly. In the case of an average particle size in the vicinity of 0.7 μm, the coercive force is 17 kOe; in the vicinity of 0.6

μm, the coercive force is 15 kOe; and in the vicinity of 0.5 μm, the coercive force is 10 kOe, approximately. In contrast, in the average particle size of 4 μm, the value is approximately 10 kOe. A increase in average particle size as large as 10 μm decreases the coercive force to not more than 1 kOe.

Therefore, to attain a coercive force suitable for practical use, the range of the particle size of magnet spherical particles is set in the range of 0.5 μm to 4 μm in which a coercive force higher than approximately 10 koe is obtained, more preferably, in the range of 0.6 μm to 3.5 μm in which a coercive force higher than approximately 15 kOe is obtained, and most preferably, in the range of 0.7 μm to 3 μm in which a coercive force higher than approximately 17 kOe is obtained.

Moreover, in the present invention, the magnetic powder is set to have an average degree of needle shape of not less than 75% in its approximation of the spherical particles.

In the present specification, the average degree of needle shape is provided as an average value of the degrees of needle shape of the respective particles that is defined as follows: In the present invention, the degree of needle shape is found from the following relationship with respect to the respective particles.

Degree of needle shape=$(b/a) \times 100(\%)$ where a represents the longest diameter on a projection image of a particle, and b represents the largest diameter vertical to the a of the particle. In particular, a shows the longest length on a particle image projected on a plane and b is the largest size vertical to the a on the same projection.

The average degree of needle shape thus measured represents how close or how different the average particle shape is to or from the spherical shape.

Figure 1:
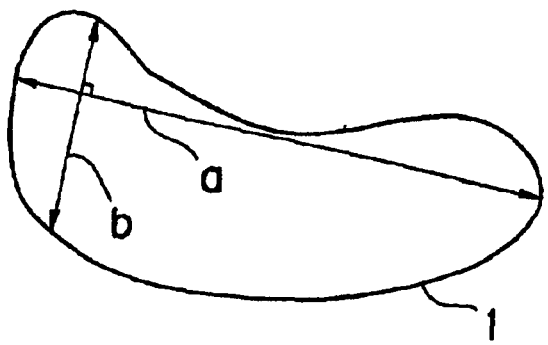
FIG. 1 is an explanatory drawing that schematically shows a method for calculating a degree of needle shape from a particle projection image.

The average degree of needle shape can be measured quickly at low costs by using graphical analyzing techniques using a computer. The average degree of needle shape may preferably be measured by the following method. First, prior to measurements, measuring samples are provided in a manner so as to thinly spread alloy particles. These samples are spread as thinly as possible so as not to allow the particles to overlap each other. A particle image is photographed by using an scanning electron microscope (SEM) having a magnification of 4000 times, and the resulting data of the particle image is inputted to the computer through a scanner; thus, images showing shapes of respective particles are extracted, and image data of 100 particles are selected. Then, with respect to each of the particle images, the longest length a and the largest size b that is vertical to the longest length a are obtained by the computer. FIG. 1 exemplifies measurements of the longest length a and the largest size b that is vertical thereto of an image of a certain particle 1. In accordance with the above equation, the degree of needle shape of each particle is calculated, and an average of 100 particles is obtained to provide the average degree of needle shape. The average degree of needle shape thus measured indicates that the closer the value to 100%, the closer the shape to the spherical shape.

Figure 4:
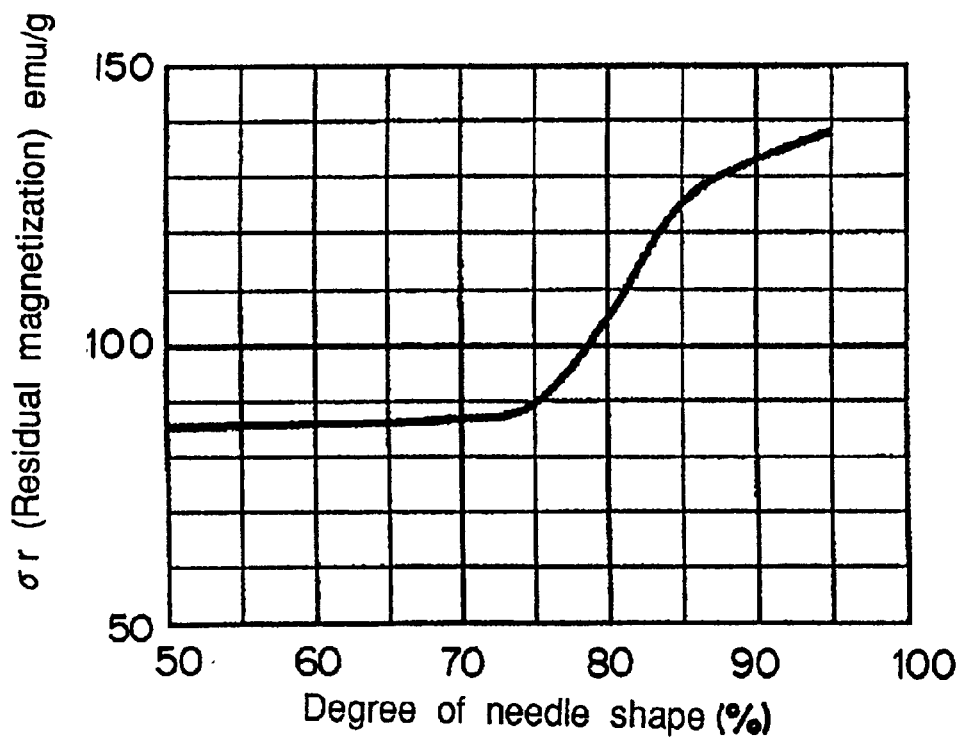
FIG. 4 is a graph that shows the relationship between residual magnetization and average degree of needle shape of powder of $Sm_2Fe_{17}N_3$ alloy.

In FIG. 4, for $Sm_2Fe_{17}N_3$ based particles, a number of data of alloy powders that have various average degrees of needle shape and also have an average particle size of approximately 1.5 μm are plotted; thus, the relationship between residual magnetization of bonded magnets and average degree of needle shape is shown. However, this Figure shows its typical data, and it does not show a width of dispersion to a certain degree which would exist in an actual case.

This figure shows that in the case of an average degree of needle shape of not more than 70%, the residual magnetization is 87 emu/g, which is substantially constant, and that the average degree of needle shape exceeding 75% improves the residual magnetization to 89 emu/g. Moreover, in the average degree of needle shape of 80%, the residual magnetization is 102 emu/g, in the average degree of needle shape of 85%, the residual magnetization 125 emu/g, in the average degree of needle shape of 90%, the residual magnetization 133 emu/g, and in the average degree of needle shape of 95%, the residual magnetization 138 emu/g. In this manner, as the magnetic particles become closer to the spherical shape, the residual magnetization is improved greatly. The results show that when it is not less than 75%, the effect of an increase in the average degree of needle shape comes to be exerted on an increase in the residual magnetization; therefore, the average degree of needle shape is preferably set at not less than 80%, more preferably, not less than 85%, and most preferably, not less than 90%.

Figure 5:
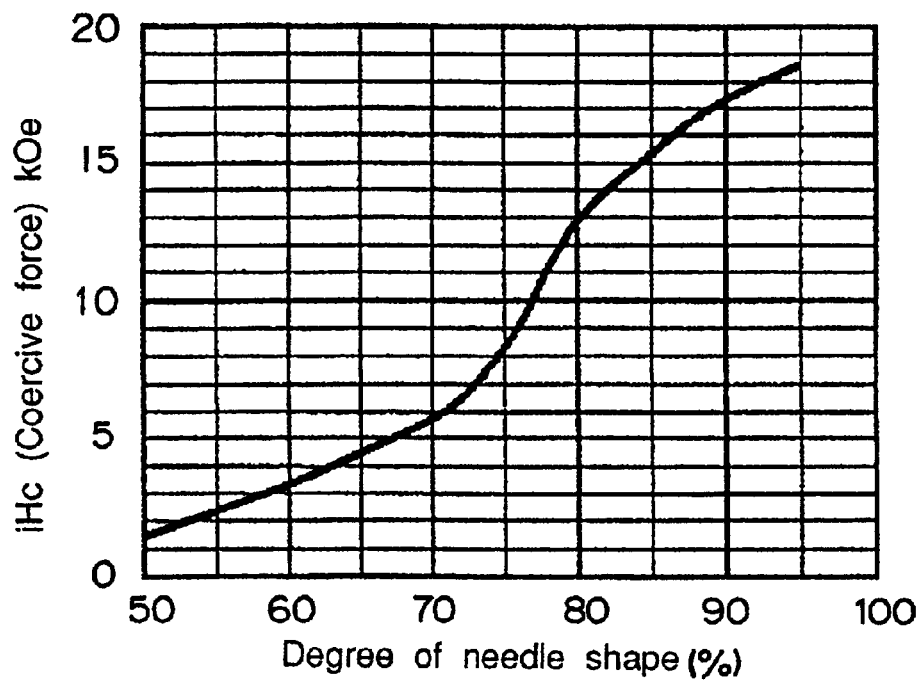
FIG. 5 is a graph that shows the relationship between coercive force and average degree of needle shape of powder of $Sm_2Fe_{17}N_3$ alloy.

FIG. 5 shows the relationship between the coercive force and the average degree of needle shape based upon a number of data with respect to alloy powders that have average degrees of needle shape of various levels, and also have an average particle size of 1.5 μm. This Figure shows typical data, and in actual cases, there is a certain degree of width. In the case of an average degree of needle shape of not more than 70%, the coercive force is not more than 5.8 kOe; however, in the case of an average degree of needle shape exceeding 75%, the coercive force is improved to 8.2 kOe. When the average degree of needle shape is 80%, the coercive force is 12.8 kOe, when 85%, it is 15.2 kOe, when 90%, it is 17.3 kOe, and when 95%, it is 18.6 kOe; thus, as the particles become closer to the spherical shape, the coercive force is improved greatly. The results show that when it is not less than 75%, the effect of an increase in the average degree of needle shape comes to be exerted on an increase in the coercive force; therefore, the average degree of needle shape is preferably set at not less than 80%, more preferably, not less than 85%, and most preferably, not less than 90%.

Moreover, in the present invention, the particles of the magnetic powder are provided as Sm—Fe—N based alloy powder, and the average particle size of the alloy powder is set in the range of 0.5 to 10 μm, and has an average degree of roundness of not less than 78%, which is represented by the average value of the number of particles obtained by the following equation:

Degree of roundness=$(4\pi S/L2) \times 100(\%)$

Here, S represents an area of particle projection on a plane, and L represents a peripheral length of the outline of the same particle image projected on the plane.

Figure 2:
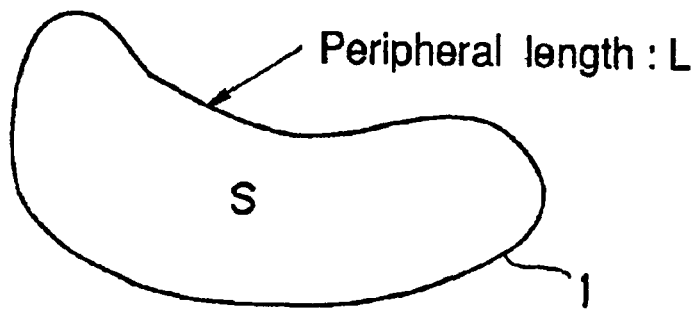
FIG. 2 is an explanatory drawing that schematically shows a method for calculating a degree of roundness of a particle from a particle projection image.

The average degree of roundness is calculated in the following manner: First, with respect to measuring samples, a particle image is photographed by using an SEM having a magnification of 4000 times, and the resulting data of the particle image is inputted to the computer through a scanner; thus, images showing shapes of respective particles are separated and extracted, and particle image data of 100 particles are picked up. Then, with respect to each of the particle images, the area S and the peripheral length L of the particle image are found by computer image analyses. As illustrated in FIG. 2, the area S and the peripheral length L of the particle image are found from a projected image of an elongated particle 1, and the value $(4\pi S/L^2) \times 100$ of the above-mentioned equation is found. In accordance with the above-mentioned equation, for example, with respect to 100 particles, the degree of roundness is calculated for each of the particles, and an average of the 100 particles is calculated; thus, the average degree of roundness is obtained. With respect to the degree of roundness, the closer the value to 100%, the closer its cross-section to the round shape.

Figure 6:
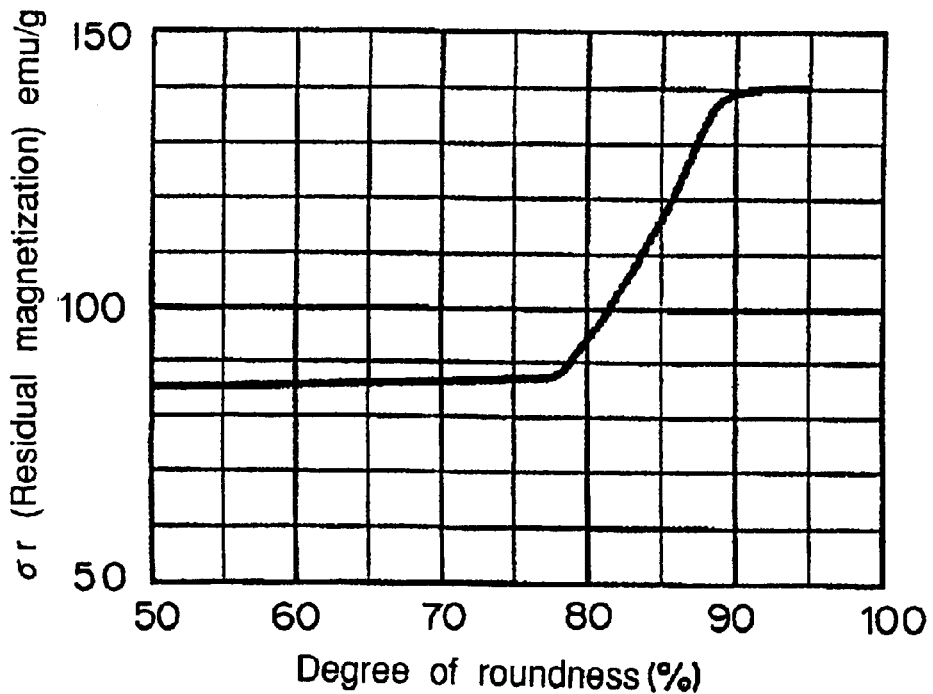
FIG. 6 is a graph that shows the relationship between residual magnetization and average degree of roundness of powder of $Sm_2Fe_{17}N_3$ alloy.

FIG. 6 is a graph with plotted data that show the relationship between the residual magnetization and the degree of roundness based upon a number of data with respect to alloy powders that have average degrees of roundness of various levels, in the average particle size of 1.5 μm. This Figure shows typical data, and in actual use, there is a certain degree of width. In the case of an average degree of roundness of not more than 70%, the residual magnetization is not more than 87 emu/g; however, in the case of an average degree of roundness exceeding 78%, the residual magnetization is improved to 89 emu/g. When the average degree of roundness is 80%, the residual magnetization is 94 emu/g, when the average degree of roundness is 85%, it is 115 emu/g, and when the average degree of roundness is not less than 90%, it is 140 emu/g; thus, as the particles become closer to the spherical shape, the residual magnetization is improved greatly. The results show that when it is not less than 78%, the effect of an increase in the average degree of roundness comes to be exerted on an increase in the residual magnetization; therefore, the average degree of roundness is preferably set at not less than 80%, more preferably, not less than 85%, and most preferably, not less than 90%.

Figure 7:
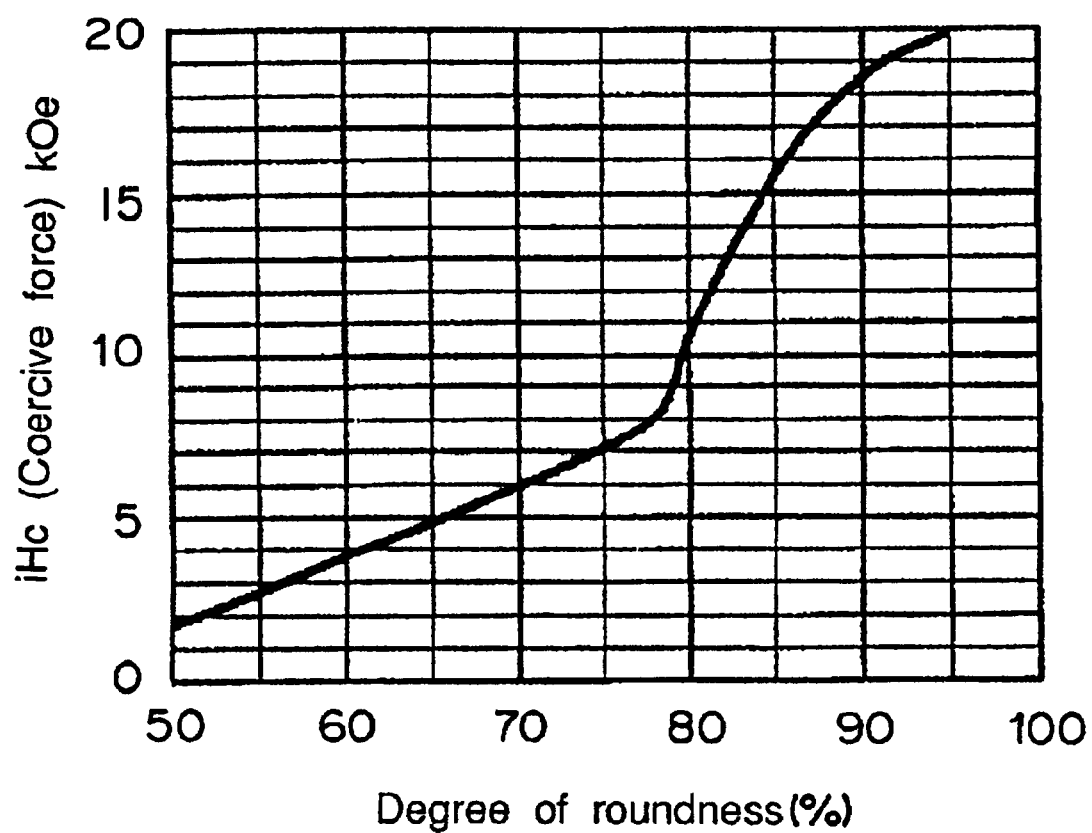
FIG. 7 is a graph that shows the relationship between coercive force and average degree of roundness of powder of $Sm_2Fe_{17}N_3$ alloy.

In FIG. 7, for $Sm_2Fe_{17}N_3$ based particles, a number of data of alloy powders that have average degrees of roundness in various levels and also have an average particle size of 1.5 μm are plotted, showing the relationship between coercive force and average degree of roundness is shown. However, this figure shows typical data, and in actual use there is a certain degree of width. With respect to the coercive force, this Figure shows that in the average degree roundness of not more than 70%, the coercive force is 5.8 kOe, which is constant; however, in the average degree of roundness exceeding 78%, the coercive force is improved to 8.2 kOe. When the average degree of needle shape is 80%, the coercive force is 10.8 kOe, when 85%, it is 15.5 kOe, when 90%, it is 18.4 kOe, and when 95%, it is 20.0 kOe; thus, as the particles become closer to the spherical shape, the coercive force is improved greatly.

The results show that when it is not less than 78%, the effect of an increase in the average degree of roundness comes to be exerted on an increase in the coercive force; therefore, the average degree of roundness may preferably be set at not less than 80%, more preferably, not less than 85%, and most preferably, not less than 90%.

Here, the average degree of needle shape may be used for evaluating the shape of particles from macroscopic viewpoints, and can determining whether the particle projection view has a round shape or an elliptical shape, or whether or not the particles aggregate. A low average degree of needle shape indicates that most of the particles have an elliptical or elongated shape with a narrowed portion. The elliptical shape of the particles reduces a coercive force. Moreover, the particles cannot form mono-magnetic domain, resulting in a reduction also in the residual magnetization. In particular, with not less than two particles aggregating with each other cause reversed magnetic domains appear at the neck portion.

Moreover, the particles not having a spherical shape, upon forming a bonded magnet from the magnetic powder, raise problems of a low filling rate and degradation in the magnetic field orientation.

The average degree of roundness is used for evaluating the shape of particles averaged from the microscopic viewpoint, and enables judgments as to whether or not there are protrusions, irregularity, and adhesion of fine particles on the surfaces of the particles. The protrusions and irregularity on the particle surface tend to cause a reversed magnetic domain therein, reducing coercive force. Moreover, the adhesion of fine particles on the surface gives adverse effects on the formation of mono-magnetic domain particles, then reducing residual magnetization. In the case of protrusions and irregularity on the particle surface, in forming a bonded magnet of the magnetic powder, the particles collide with each other, and subsequently tend to cause a stress on the particle. This causes problems of a reduction in the coercive force and a failure in increasing the filling rate.

For this reason, in the present invention, the measurements of the average degree of needle shape and/or the average degree of roundness can represent a shape of particles by values from both of the macroscopic and microscopic viewpoints, and provides the relationship between particle shape thus represented by figures and magnetic properties. Therefore, the measurements of the average degree of needle shape and/or the average degree of roundness on the can particle shape predict the magnetic properties of a bonded magnet formed by a such selection of particles.

Therefore, the magnetic powder of $Sm_2Fe_{17}N_3$ alloy of the present invention may be preferably provided as spherical particles having an average particle size in the range of 0.6 to 10 μm and an average degree of needle shape of not less than 80%, obtaining a coercive force of not less than 12.5 kOe and a residual magnetization of not less than 100 emu/g.

Moreover, the magnetic powder of $Sm_2Fe_{17}N_3$ alloy of the present invention may be provided as spherical particles having an average particle size in the range of 0.7 to 4 μm and an average degree of needle shape of not less than 85%; thus, it is possible to obtain a coercive force of not less than 15 kOe and a residual magnetization of not less than 125 emu/g.

With respect to the most preferable ranges, the magnetic powder of an $Sm_2Fe_{17}N_3$ alloy of the present invention is provided as spherical particles having an average particle size in the range of 0.7 to 4 μm and an average degree of needle shape of not less than 90%; thus, it is possible to obtain a coercive force of not less than 17 kOe and a residual magnetization of not less than 130 emu/g.

As described above, the magnetic properties of the $Sm_2Fe_{17}N_3$ alloy are greatly dependent on its average particle size, and shapes of the particles. For methods for manufacturing the Sm—Fe—N based magnetic powder, Japanese Patent Publication JP-A6-151127 descloses powder of Sm—Fe based particles obtained through a method in which carbonyl iron powder is used as material iron powder and the temperature of the reduction-diffusion method used in reducing the rare earth element is set in the range of 650 to 880° C. However, in this method, although having a certain degree of roundness, the particles are inferior in independence and separation, and since those particles having a gourd shape with a narrowed portion or a twin joined shape are produced, only particles having an average degree of needle shape of less than 70% are obtained. Moreover, since the particle size is greatly dependent on a particle size of the carbonyl iron powder, the particle size are not sufficiently controlled. Consequently, it is inevitable to pulverize the powder in order to obtain alloy powder that is capable of providing mono-magnetic domain size.

In an attempt to obtain powder having a spherical particle shape, it has been conventionally known that alloy powder having a spherical particle shape can be obtained by gas-atomizing a melt having some components (for example, see Japanese Patent Publication JP-B7-50648). However, the average particle size is not less than 10 times as large as the mono-magnetic domain size, and although no problems arise with respect to the filling rate and magnetic-field orientation, the particles are so large as to have a multi-magnetic domain structure, with the result of a serious reduction in coercive force.

The following description will discuss a preferable process for obtaining the $Sm_2Fe_{17}N_3$ based alloy powder mentioned above having a spherical shape.

In the process for producing the alloy powder of the present invention, first, an oxide of Sm and Fe is used as a starting material, and the oxide of Sm and Fe is reduced and diffused with a metal reducing agent, and then subjected to a nitriding process. A co-precipitation method is adopted for preparing the oxide of Sm and Fe.

In the process utilizing the co-precipitation method and the reduction-diffusion method, the process may adopts steps of: dissolving Sm and Fe in an acid; reacting a substance in the aqueous solution, which substance produces a precipitate including an insoluble salt including Sm and Fe ions or a hydroxide, etc., so that an Sm compound and an Fe compound are co-precipitated; calcining the resulting precipitate to produce a metal oxide; and reducing the resulting metal oxide.

Moreover, in the production process of the present invention, the precipitate of Sm and Fe is utilized, which is formed by precipitate particles having a uniform distribution of constituent elements, a sharp particle size distribution and a spherical particle shape, as a result from a co-precipitation. The above method includes steps calcining the precipitate to obtain a metal oxide and subsequently heating the metal oxide in a reducing atmosphere.

In this process, the steps for obtaining the precipitate particles is particularly important because the shape of the precipitate particles, as it is, determines the particle size and shape of the metal oxide resulting from the oxidation thereof and the alloy powder resulting from the reduction thereof. Therefore, it is important to make the shape of the precipitate particles as close to the spherical shape as possible.

To obtain the alloy powder particles of the present invention, it is preferable to set the precipitate particles to have a substantially spherical shape, and also to set the particle size and particle size distribution of the precipitate particles so as to be in the range of 0.05 to 20 $\mu$m in average particle size and in the range of 0.1 to 20 $\mu$m in the total particle sizes.

Sm and Fe, which are positive ions in the constituent components, are uniformly mixed in water to obtain such precipitate particles. In order to commonly dissolve these metal elements, preferable acids are mineral acids including hydrochloric acid, sulfuric acid and nitric acid, and these can dissolve the above metallic ions at high concentrations. Moreover, chlorides, sulfates, or nitrates of Sm and Fe may be dissolved in water.

Moreover, not limited to an aqueous solution, the solution may be provided as a non-aqueous solution. For example, a solution formed by dissolving organic metals in the form of metal alkoxide in an organic solvent such as alcohol, acetone, cyclohexane and tetrahydrofuran, may be adopted.

A substance for producing insoluble salts with these ions is added to the solution having the dissolved Sm and Fe ions. With respect to this substance, negative ions (nonmetallic ions), such as hydroxide ions, carbonate ions and oxalic acid ions, are preferably used. Any solution containing a substance capable of supplying these ions may be used. For example, substances for supplying hydroxide ions include ammonia and sodium hydroxide. Substances for supplying carbonate ions include ammonium bicarbonate and sodium bicarbonate. Substances for supplying oxalic acid ions include oxalic acid.

To the non-aqueous solution formed by dissolving the metal alkoxide in the organic solvent is added water so as to allow the metal hydroxide to deposit. Besides these, any substance that reacts with a metal ion to produce an insoluble salt may be applied to the present invention. In particular, a sol-gel method may be preferably used as the method for forming an insoluble hydroxide.

By controlling the reaction between metallic ions of two kinds and non-metallic ions, it is possible to obtain an optimal alloy powder material having a uniform metal-element distribution, a sharp particle size distribution and a smooth spherical particle shape. The application of such a material improves the magnetic properties of alloy powder (magnetic material) that is a finished product. The control of this precipitation reaction can be carried out by properly setting factors, such as the supplying rate of the metallic ions and non-metallic ions, the reaction temperature, the concentration of the reaction solution, the stirring state of the reaction solution, and the pH at the time of the reaction. These conditions are first selected so as to optimize the yield of the precipitate, and then determined through observations under a microscope so as to maintain the unification (particle shape) of the precipitate particles and a sharp particle size distribution of the precipitate particles. Moreover, the state of the precipitate varies greatly depending on what kinds of chemical substances are selected and what type of co-precipitation reaction is adopted. The conditions of the precipitation process substantially determine the particle shape and the particle size distribution of the alloy powder as the final magnetic material. As described earlier, the shape of the particles is closely related to the magnetic properties of the magnetic material, and the control of this precipitation reaction is therefore very important. In the precipitate particles obtained in this manner, Sm and Fe exist in a sufficiently mixed state.

In the present invention, normally, it is preferable to remove the solvent from the precipitate prior to the calcination. The sufficient removal of the solvent in such a solvent-removing process makes the calcination easier. Moreover, in the case where a solvent has such a characteristic as to increase the solubility to a precipitate when the temperature thereof increases, the precipitate particles partially dissolve in the solvent, and a number of particles tend to aggregate, with the result that the central particle size increases and the particle size distribution is widened; therefore, it is preferable to sufficiently remove the solvent.

At the time of the calcination process of the precipitate, the insoluble salt consisting of metallic ions and non-metallic ions is heated so that the non-metallic ions are decomposed, with the metal oxide being left. Therefore, it is preferable to carry out the calcination process in an oxygen-rich condition, that is, in an oxidizing atmosphere. Moreover, with respect to non-metallic ions, it is preferable to select those ions containing oxygen. Examples of such non-metallic ions include ions from hydroxide, bicarbonic acid, oxalic acid, citric acid, etc.

In contrast, those ions such as sulfide ions allow these metals to commonly deposit; however, since the oxidation of the sulfide is hardly carried out unless the temperature is high, the application of those ions is not preferable. Ions from phosphoric acid, boric acid and silicic acid react with rare earth element ions or transition metal ions to produce an insoluble salt; however, the resulting phosphate, borate and silicate are not easily allowed to form oxides in the following calcination process. Therefore, it is difficult to apply these to the present invention.

Therefore, in the present invention, besides ions from hydroxide, carbonic acid and oxalic acid, non-metallic ions, which are most preferably applied to the precipitation reaction, are those ions from an insoluble organic salt that is easily burnt upon application of heat.

In the case where the insoluble organic salt is subjected to hydrolysis to produce a hydroxide, as in an alkoxide, it is preferable to once form it into a hydroxide and then to heat the hydroxide.

The purpose of this calcination is to decompose the nonmetallic ions so to obtain a metal oxide; therefore, the calcination is carried out at a temperature not less than a temperature at which such decomposing reaction takes 4place. Therefore, although the calcination temperature varies depending on the kinds of metallic ions and the kinds of nonmetallic ions, it is preferable to calcine at a temperature in the range of 800 to 1300° C. for several hours, and more preferably, 900 to 1100° C. In this case, the calcination is carried out in an air or in an oxidizing atmosphere. It is preferable to supply sufficient air to the calcination furnace by using a ventilator, etc., or to introduce oxygen into the furnace.

The calcination can provide a metal oxide having particles in which a microscopic mixture of a rare earth element and a transition metal element is made. These oxide particles are formed by an oxide having superior particle performances that are derived from the shape distribution of the above-mentioned precipitate particles.

In order to obtain alloy powder from the metal oxides, a reduction-diffusion reaction is applied. In this case, the metal oxides are Sm oxide and Fe oxide. Reduction of the iron oxide to metal is performed by using H2, CO or hydrogen carbide such as CH4, while the reduction to iron is sufficiently carried out by introducing these reducing gases into the furnace and heating it in a reducing atmosphere thus formed. The reducing temperature may be set in the range of 300 to 900° C. Temperatures below this range make it difficult to carry out the reduction of the transition metal oxide, and temperatures higher than this range cause the oxide particles to grow and to biasly deposit due to the high temperature, resulting in deviations from a desired particle size. The reducing temperature is preferably set in the range of 400 to 800° C.

Moreover, in addition of the above-mentioned co-precipitation method, another method for sufficiently mixing the fine oxide particles of the constituent elements may be adopted. More specifically, $Sm_2O_3$ having an average particle size of less than 5 $\mu$m and iron oxide having an average particle size of 2 $\mu$m are mixed, which later is once heated at a temperature in the range of 300 to 900° C. in a reducing gas so that the iron oxide is reduced to metal iron.

Although this method does not provide the homogeneity of mixture between Sm and Fe so high as the co-precipitation method, it can carry out a uniform mixing process better than the case in which metal iron is used as the starting material, as conventionally made. The reason for this is explained as follows:

(1) In the case where metal iron and samarium oxide are used as the starting materials, an assumption is that metal iron powder having an average particle size of not more than 10 $\mu$m needs to be used, and this condition is satisfied by carbonyl iron powder. However, the carbonyl iron powder industrially obtained has an average particle size of approximately 4 $\mu$m in the minimum. Here, in general, powder of $Sm_2O_3$ has an average particle size around 1 $\mu$m, which is one-fourth of the carbonyl iron powder (1/64 in volume). Under these circumstances, it is difficult to carry out a uniform mixing process.

(2) Carbonyl iron powder, which has an external appearance like a true globe and a smooth surface, is superior in fluidity, while $Sm_2O_3$ powder has an irregular external appearance and is comparatively inferior in fluidity. Moreover, the bulk density of carbonyl iron powder is in the range of 3 to 4, while $Sm_2O_3$ is a comparatively small value of 0.9 in density. Consequently, even if the two types of powder are mechanically mixed with each other, it is not possible to obtain a satisfactory result.

(3) On the other hand, where both types of oxide powder are mixed with each other, it is possible to industrially prepare materials maintained in the same level in the particle size, fluidity and bulk density, and consequently to provide a comparatively uniform mixture.

(4) In the present invention, a mixture formed by mixing oxides with each other as the materials is temporarily reduced in a reducing gas so that, in the same manner as the above-mentioned co-precipitation method, this may be subjected to a reduction-diffusion process using metal Ca or hydrogenated Ca.

The Sm oxide in the metal oxide cannot be reduced by a heating process under the reducing gas atmosphere as mentioned above. The reducing process is available when a metal, which forms an oxide whose free energy of formation is smaller than the target Sm at the processing temperature (in other words, the free energy of formation is negative, and its absolute value is greater), is mixed therewith and heated. Examples of such a reducing metal include alkaline metals such as Li, Na, K, Rb and Cs, and alkaline earth metals such as Mg, Ca, Sr and Ba. The rare earth metal oxide in the particles can be reduced to metal by mixing with such a metal having a great reducing strength and heating in an inert gas atmosphere. Here, from the viewpoint of security in handling and costs, metal calcium or its hydride is most preferably used.

In the reduction-diffusion method using an alkaline metal or an alkaline earth metal as a reducing agent, to a mixture of fine metal Fe powder obtained from a reduction by the reducing gas and a samarium oxide is added metal calcium, or calcium hydride, and this is heated in an inert gas atmosphere or in a vacuum to allow the samarium oxide to contact the fused liquid or its vapor of the alkaline or alkaline earth metal and to be reduced to metal samarium. With this reducing reaction, alloy powder of Sm and Fe can be obtained in a form of blocks.

Alkaline or alkaline earth metal reducing agent mentioned above is used in the form of particles or powder; and in particular, from the viewpoint of costs, it is preferable to use granular metal calcium having a particle size of not more than 4 mesh. This reducing agent is used in an amount in the range of 1.1 to 3.0 times the reaction equivalent, and more preferably, 1.5 to 2.0 times the reaction equivalent (which is a stoichiometric amount required for reducing a rare earth oxide, and in the case of use of a transition metal oxide, includes an amount required for reducing this).

It is possible to reduce iron oxide by using this reducing agent. Therefore, without the preliminary reducing process of the iron oxide by the use of a reducing gas, the reducing process may be directly carried out by using the Ca reducing agent. In this case, it is preferable to preliminarily reduce most of the iron oxide into metal prior to the reducing process of samarium by the use of the reduction-diffusion process. If all the predetermined amount of the iron oxide required for the alloy composition is Ca-reduced, the amount of Ca required for the reduction becomes excessive, resulting in a high temperature due to the heat generation of Ca at the time of the reduction; this not only causes the particle to become bulky, but also raises the possibility of the product being scattered in the furnace due to an explosive reaction in the worst case. Therefore, the rate of removal of oxygen in the iron oxide prior to the reduction-diffusion process is preferably set at not less than 40% (a preliminary reduction rate to metal iron of not less than 40%). In the case of residual oxygen exceeding 60% in the iron oxide is be removed in the next Ca reduction process, a large amount of the Ca reducing agent is required, causing a problem of wasteful use, as well as a failure in obtaining alloy powder particles having a uniform shape with superior dispersion. Here, the rate of removal of oxygen is referred to as percentage of the amount of oxygen that is reduced and removed with respect to the amount of oxygen as a whole that exists in the oxide of the transition metal.

In the present invention, in addition to the reducing agent, a powdering agent may be used, if necessary. This powdering agent is used on demand so as to accelerate powdering of the product in the form of blocks and dispersion of the alloy particles upon carrying out a wet process, which will be described later. With respect to the powdering agent, examples thereof include alkaline earth metal salts such as calcium chloride, which has been disclosed in Japanese Patent Publication JP-A 63-105909, and calcium oxide. Each of these powdering-accelerating agents is used at a ratio in the range of 1 to 30% by weight with respect to the rare earth oxide used as the rare earth source, and more preferably, in the range of 5 to 30% by weight.

In the present invention, the above-mentioned material powder, reducing agent, and powdering agent, used if necessary, are mixed, and this mixture is loaded into a reaction furnace, and is subjected to a substituting process in an inert gas atmosphere, such as argon gas, other than nitrogen, and heated so as to be reduced. Moreover, the heating temperature used in the reducing process is preferably set in the range of 700 to 1200° C., and more preferably, 800 to 1100° C. Although the period of time of the heating process is not particularly limited, it is normally set in the range of 10 minutes to 10 hours so as to carry out the reducing reaction uniformly, and more preferably, in the range of 10 minutes to two hours. This reducing reaction provides a porous Sm—Fe based alloy in the form of blocks.

In order to obtain an Sm—Fe—N based alloy powder from the Sm—Fe based alloy, the same Sm—Fe based alloy is successively subjected to a nitriding process by introducing nitrogen gas into the same furnace. Instead of nitrogen gas, a compound gas, which can supply nitrogen after having been decomposed by heat application, for example, ammonia, may be utilized. In the preceding reduction-diffusion process, the Sm—Fe alloy has a porous granular shape; therefore, without being pulverized, this is subjected to a heating process in the same furnace by immediately adjusting and switching to a nitrogen atmosphere. This operation makes it possible to subject the Sm—Fe alloy to a nitriding process uniformly, thereby providing an Sm—Fe—N alloy.

In this nitriding process, the temperature is lowered from the heating temperature range for the reduction to 300 to 600° C., and more preferably, 400 to 550° C., and in this temperature range, the atmosphere is switched to the nitrogen atmosphere. The nitriding process temperature less than 300° C. causes insufficient diffusion of nitrogen into Sm—Fe based alloy that is a reaction product obtained in the above process, thereby making it difficult to effectively carry out the nitriding process uniformly. Moreover, the nitriding process temperature exceeding 600° C. causes the Sm—Fe based alloy to be decomposed into a rare earth nitride and metal iron a-Fe, resulting in serious degradation in the magnetic properties in the resulting alloy powder. The abovementioned heating process time is set in such a range that the nitriding process is sufficiently carried out uniformly; and in general, the period of time is set in the range of 4 to 12 hours.

The reaction product of the nitriding process is a mixture containing byproducts such as CaN, CaO and unreacted excessive calcium, as well as the product alloy powder, and forms sintered blocks including these in a composite form. Therefore, the product mixture is next put into cool water so that CaN, CaO and metal calcium are separated from the alloy powder as $Ca(OH)_2$. Moreover, $Ca(OH)_2$ still remaining therein is removed by washing the alloy powder with acetic acid or hydrochloric acid. In the case where the Sm—Fe based alloy that is the porous granular product is put into water, oxidation of the metal calcium by water and a hydrating reaction of the byproduct CaO allow the sintered product mixture in the composite granular form to be powdered, that is, to be formed into fine powder.

The resulting slurry formed by the powdering is stirred, and hydroxides such as alkaline metal, etc., on the upper portion are removed through decantation, and processes of water pouring, stirring and decantation are repeated so that the resulting alloy powder is removed from the hydroxides. Moreover, partially residual hydroxides are completely removed by washing with acid in the range of pH3 to pH6, and more preferably, pH4 to 5, such as acetic acid or hydrochloric acid. After the completion of such a wet treatment, for example, after being washed with water, this is further washed with an organic solvent such as alcohol or acetone, and then dehydrated and dried in a vacuum; thus, Sm—Fe alloy powder is produced.

EXAMPLES

Example 1

1. Precipitation Reaction

Pure water (30 liters) was poured into a reaction tank, to this was added 520 g of $H_2SO_4$ of 97%, was dissolved 484.8 g of $Sm_2O_3$, and was added aqueous ammonia of 25% so as to adjust the pH to the vicinity of neutral. To this aqueous solution was added 5200 g of $FeSO_4 \cdot 7H_2O$ and this was completely dissolved to prepare a metal dissolved solution.

Pure water (12 liters) was poured into another reaction tank, and to this were mixed 2524 g of ammonium bicarbonate and 1738 g of aqueous ammonia of 25% to prepare an ammonium carbonate solution. The ammonium carbonate solution was gradually added to the metal dissolved solution, while the reaction tank was being stirred; thus, aqueous ammonia was added thereto so as to adjust the pH to 8.0±0.5 in the final stage after addition of all the amount thereof. The stirring was stopped with respect to the solution, and this was allowed to stand still so that a product was precipitated on the bottom of the container. One portion of the precipitate thus obtained was sampled, and observed under a microscope; thus, spherical particles with uniform grains were observed. The average particle size was measured to be 1.4 μm by using a Fischer subsieve sizer*.

2. Filtration and Washing

The precipitate product was washed on filter paper by being sucked while supplying ion exchange water from above. The decantation was continued until the electrical conductivity of the filtrate was reduced to not more than 50 µS/m. The precipitate cake was washed, obtained by a suction filtering process, and dried in a dryer at 80° C.

3. Calcination in Air

The dried case was put into a crucible made of alumina, and calcined in the air at 1100° C. for three hours.

4. Particle Size Adjustment

After the calcined matter had been disintegrated with hands, this was further pulverized by a hammer mill. The particle size of this metal oxide powder was measured to be 1.3 µm by using a Fischer subseive sizer*.

5. Hydrogen Reduction

The pulverized powder was loaded into a tray made of steel, and this was placed into a tube furnace, and subjected to a heating treatment at 700° C. for 10 hours while hydrogen of a purity of 100% was allowed to flow at 20 liters/minute. The resulting black powder had an oxygen concentration of 7.2 wt %.

6. Reduction-diffusion Reaction and Nitriding Reaction

The black powder (1000 g) obtained in the preceding process and granular Ca (350.7 g) were mixed, loaded into a tray made of steel, and set in a furnace in an argon gas atmosphere. After the furnace had been evacuated to a vacuum, this was heated at 1000° C. for one hour while argon gas was being introduced thereto. Next, the heating process was stopped, and this was successively cooled to 450° C. in the argon gas atmosphere; thereafter, this was maintained constant at this temperature. Then, after the furnace had been again evacuated to a vacuum, nitrogen gas was introduced thereto. This was heated for five hours while nitrogen gas was being introduced at a pressure not less than the atmospheric pressure, and the heating process was then stopped, and cooled off.

7. Washing with Water

The resulting nitrided alloy powder was put into ion exchange water (5 liters); thus, the reaction product was immediately allowed to powder to start to separate into the alloy powder and Ca components. Processes including stirring in water, standing still and removal of supernatant were repeated five times, and the resulting matter was finally washed with 5 liters of an aqueous solution of acetic acid of 2 wt %; thus, the separation of Ca components was completed. This was dried in a vacuum to obtain alloy powder of $Sm_2Fe_{17}N_3$.

8. Measurements on Magnetic Properties

The resulting powder had a superior dispersing property, and observations under an electronic microscope showed that it had a spherical shape. The particle size of the powder was measured to be 2.5 µm by using a Fischer subseive sizer*, and the average degree of needle shape was 83%, while the average degree of roundness was 87%. The powder had magnetic properties of σr 120 emu/g and iHc 15.8 kOe. Moreover, the concentration of oxygen contained in the powder was 0.25 wt %, and no bias precipitation of Sm and Fe was observed under observations of the cross-section by means of EPMA. Moreover, no phases other than the main phase of the Sm—Fe alloy were observed by an X-ray diffraction using Cu—Kα as the ray source, and in particular, no trace of α-Fe that was a pure iron component was found.

Example 2

1. Co-precipitation

Samarium nitrate hexahydrate $Sm(NO_3)_3 \cdot 6H_2O$ (513.4 g), and iron nitrate nonahydrate $Fe(NO_3)_3 \cdot 9H_2O$ (3432.3 g) were weighed, and were simultaneously put into 10 liters of ion exchange water while being stirred. After having been confirmed that they had been completely dissolved, to this was further added urea $(NH_2)_2CO$ (2992.5 g) while being continuously stirred, and the temperature of the solution was raised to 80° C. while being continuously stirred. At this time, urea was hydrolyzed into ammonia and carbon dioxide so that matter containing metal was precipitated through a homogeneous reaction.

2. Filtration and Washing

The product was taken onto filter paper, and was sucked while supplying ion exchange water from the upper portion of the filter paper. This operation was continued until the specific resistance of the filtrate had reached to not more than 50 pS/m. The washed cake was dried in a dryer at 80° C.

3. Calcination in Air

The dried case was put into a crucible made of alumina, and calcined in the air at 1100° C. for three hours.

4. Particle Size Adjustment

After the calcined matter had been disintegrated with hands, this was further pulverized by a hammer mill. The particle size of this metal oxide powder was measured to be 1.3 µm by using a Fischer subseive sizer*.

5. Hydrogen Reduction; Preliminary Reduction

In order to preliminarily reduce iron oxide, the pulverized powder was loaded into a tray made of steel, and this was placed into a tube furnace, and subjected to a heating treatment at 700° C. for 10 hours while hydrogen of a purity of 100% was allowed to flow at 20 liters/minute. The resulting powder obtained by this hydrogen reduction had an oxyxgen concentration of 7.2 wt %.

6. Reduction-diffusion Reaction and Nitriding

Part of the powder (1000 g) obtained in the preceding process and granular Ca (350.7 g) having a particle size of not more than 6 mm were mixed, loaded into a tray made of steel, and set in a furnace in an inert gas atmosphere. After the furnace had been evacuated to a vacuum, this was heated at 1000° C. for one hour while argon gas was being introduced thereto so that the mixture powder was reduced by calcium. Next, the heating process was stopped in the furnace, and this was successively cooled to 450° C. in the argon gas atmosphere; thereafter, this was maintained constant at this temperature. Then, after the furnace had been again evacuated to a vacuum, nitrogen gas was introduced thereto. This was heated for five hours while nitrogen gas was being introduced at a pressure not less than the atmospheric pressure so that the reduced powder was nitrided, and the heating process was then stopped, and the powder was cooled off in the furnace.

7. Washing with Water

The resulting product was put into ion exchange water (5 liters); thus, the reaction product was immediately allowed to powder to start to separate into the alloy powder and calcium-containing components. Processes including stirring in water, standing still and removal of supernatant were repeated several times, and the resulting matter was finally washed with 5 liters of an aqueous solution of acetic acid of 2 wt %; thus, the separation of Ca components was completed. This was dried in a vacuum to obtain alloy powder of $Sm_2Fe_{17}N_3$ 8. Measurements on Magnetic Properties The resulting powder had a superior dispersing property, and observations under an electronic microscope showed that it had a spherical shape. The particle size of the powder was measured to be 2.8 µm by using a Fischer subseive sizer*. The powder had magnetic properties of σr 140 emu/g and iHc 18 kOe. The concentration of oxygen contained in the powder was 0.25 wt %, and no bias precipitation of Sm and Fe was observed under observations of the cross-section by means of EPMA. Moreover, no phases other than the main phase of the Sm—Fe alloy were observed by an X-ray diffraction using Cu—Kα as the ray source, and in particular, no trace of metal iron (α-Fe phase) was found.

Example 3

Iron oxide ($Fe_2O_3$) powder (135.7 g) having an average particle size of 1.5 μm and a purity of 99.9% and samarium oxide ($Sm_2O_3$) powder (34.9 g) having an average particle size of 1.0 μm and a purity of 99.9% were kneaded together with water in a ball mill for two hours. The iron oxide powder and samarium oxide powder used here were the same as those used in Example 1. The resulting slurry was dehydrated to separate a solid matter, and the dried solid matter was pulverized in a sample mill to provide mixed powder. The resulting mixed powder was put into a tray made of soft steel, and preliminarily reduced in a furnace at 600° C. in an hydrogen flow. During the reducing process, the flow rate of hydrogen was set at 2 l/min., and the maintaining time was five hours.

The results of an oxygen analysis on the reduced powder showed that the oxygen removal rate of the iron oxide component was 89.5%. Under these conditions, the samarium oxide was not reduced by hydrogen gas. To the reduced mixture powder (178 g) was added granular metal calcium (44.50 g), and this was sufficiently mixed. This was loaded into a crucible made of soft steel, and then subjected to the same processes as those of Example 1 so as to be reduced in an electric furnace; thus, Sm—Fe—N alloy powder was obtained.

The resulting powder had a superior dispersing property, and observations under an electronic microscope showed that a number of particles thereof had a spherical shape. The particle size of the powder was measured to be 2.0 μm by using a Fischer subsieve sizer*. The average degree of needle shape was 78%, and the average degree of roundness was 81%. A bonded magnet manufactured from this powder had magnetic properties of σr 102 emu/g and iHc 12 kOe. The concentration of oxygen contained in the powder was 0.15 wt %, and no bias precipitation of Sm and Fe was observed under observations of the cross-section by means of SEM. Moreover, no phases other than the main phase of the Sm—Fe alloy were observed by an X-ray diffraction using Cu—Kα as the ray source, and in particular, no trace of metal iron (α-Fe phase) was found.

Comparative Example 1

For comparative purposes, magnetic powder was produced by using a fusing method. Metal Sm and metal iron were fused in an atomic ratio of 2 to 17, and the fused matter was injected into a water-cooling copper mold so that an alloy having a composition of $Sm_2Fe_{17}$ was obtained. The resulting ingot was coarsely pulverized by a jaw crusher, and the powder was heated and maintained at 1100° C. in an argon gas for 40 hours so as to be homogenized.

The resulting alloy powder was pulverized for two hours in a ball mill with steel balls, and subjected to a heating process at 450° C. for five hours in an atmosphere of nitrogen of 100%. The resulting powder was inferior in the dispersing property and in an aggregated state, and observations under an electronic microscope showed that the particles had polygonal shapes. The average particle size of the powder was 10 μm based upon measurements by using FSSS, the average degree of needle shape was 64%, and the average degree of roundness was 67%. With respect to the magnetic properties of the powder, the residual magnetization σr was 85 emu/g and the coercive force iHc was 8.2 kOe. The concentration of oxygen contained in the powder was 0.6 wt %, and bias precipitation of Sm and Fe was observed under observations of the cross-section by means of EPMA. Moreover, a clear peak due to α-Fe was observed by an X-ray diffraction using Cu—kα as the ray source.

As described above, since the alloy powder of the present invention has a constant spherical particle shape, it is possible to greatly improve the residual magnetization and the coercive force. The reason for this is explained as follows: Since the fine powder close to the mono-magnetic domain size is obtained without using a mechanical stress such as a pulverizing process, it is possible to reduce distortions, cracks, scratches, etc. on the surface that give serious adverse effects on the magnetic properties, and consequently to properly set the magnetic field orientation with ease so as to form spherical particles.

Moreover, when a molded member such as a bonded magnet is formed by using the alloy particles of the present invention, it is possible to improve the residual magnetization of the molded member. This is because, in the process for molding the member with the alloy particles being aligned in a direction of its axis of easy magnetization within the magnetic field, the application of the alloy powder having spherical particles makes it possible to greatly improve the degree of alignment.

In the process of producing the present invention, a reduction-diffusion method such as calcium reduction is utilized by using material powder including an oxide; therefore, spherical magnetic powder can be directly obtained, thereby making it possible to reduce distortions, cracks, scratches, etc. that give serious adverse effects on the magnetic properties. Thus, the resulting spherical particles make it possible to easily set the magnetic field orientation in the bonding agent upon magnetization. Consequently, it becomes possible to obtain magnetic powder that has improved magnetization and coercive force and is suitable for a bonded magnet.

In the process of the present invention, in particular, a co-precipitation method, which allows an insoluble salt or a hydroxide to precipitate in water, is utilized so as to obtain material particles including iron and samarium; therefore, since the material particles are fine, and since the elements, which will constitute the alloy powder, are uniformly mixed at their material stages, the particles, which have been subjected to a reduction-diffusion process and a nitriding process, have a diameter close to the mono-magnetic domain size, without the need for a mechanical stress such as a pulverizing process, and are allowed to have a spherical shape.

In the normal fusing method, that is, in the process of producing alloy powder in which ingots of samarium and iron are formed and then pulverized, in most cases, a thermal process which lasts for as long as several tens of hours needs to be provided in order to obtain a homogeneous alloy. In contrast, in the precipitation method, the thermal treatment time only requires two hours at longest. Therefore, the shortened thermal treatment time makes it possible to easily provide spherical particles.

Since the particle shape of the precipitate particles obtained in the precipitation process is closely related to the alloy powder as the finished product, it is possible to obtain alloy powder having a uniform particle shape with superior dispersion by controlling the shape of the precipitate particles, and consequently to provide a magnetic material having superior magnetic performances.

Industrial Applicability

The Sm—Fe—N based alloy powder of the present invention can be manufactured by magnet manufacturing makers, and in the magnet manufacturing makers, the process is used for making such alloy powder, and the alloy powder is formed into a predetermined shape as a bonded magnet so as to be applied to a permanent magnet used in various fields such as electric appliances, information communication apparatuses and machines.

What is claimed is:

1. A process for producing a permanent magnet material comprising Sm—Fe—N based alloy powder, comprising:
    allowing a precipitate containing Sm and Fe to co-precipitate from a solution in which Sm and Fe are dissolved;
    calcining the precipitate to form a metal oxide;
    mixing the metal oxide with a metal reducing agent;
    reducing and diffusing the metal oxide mixed with the metal reducing agent into Sm—Fe alloy powder; and
    nitriding the Sm—Fe alloy powder to obtain said Sm—Fe—N based alloy powder,
    wherein said Sm—Fe—N based alloy powder has a particle shape of an average degree of roundness of not less than 85%.

2. The process for producing a permanent magnet material comprising Sm—Fe—N based alloy powder according to claim 1, wherein said Sm and Fe are uniformly distributed in each particle.

3. The process for producing a permanent magnet material comprising Sm—Fe—N based alloy powder according to claim 1, further comprising heating said metal oxide formed by calcining the precipitate at a temperature in a range from 300 to 900° C. in a reducing gas to preliminarily reduce all or part of the iron oxide into metal iron before said reducing and diffusing the resulting metal oxide powder into Sm—Fe alloy powder.

4. The process for producing a permanent magnet material comprising Sm—Fe—N based alloy powder according to claim 1, wherein said Sm—Fe—N based alloy powder has a particle shape of an average degree of roundness of not less than 90%.

5. A process for producing a permanent magnet material comprising Sm—Fe—N based alloy powder, comprising:
    allowing a precipitate containing Sm and Fe to co-precipitate from a solution in which Sm and Fe are dissolved;
    calcining the precipitate to form a metal oxide;
    mixing the metal oxide with a metal reducing agent;
    reducing and diffusing the metal oxide mixed with the metal reducing agent into Sm—Fe alloy powder; and
    nitriding the Sm—Fe alloy powder to obtain said Sm—Fe—N based alloy powder,
    wherein said Sm—Fe—N based alloy powder has an average particle size of 0.6 to 10 $\mu$m and a particle shape having an average degree of needle shape of not less than 80%.

6. The process for producing a permanent magnet material comprising Sm—Fe—N based alloy powder according to claim 5, wherein said Sm—Fe—N based alloy powder has an average particle size of 0.7 to 4 $\mu$m and a particle shape having an average degree of needle shape of not less than 85%.

7. The process for producing a permanent magnet material comprising Sm—Fe—N based alloy powder according to claim 5, wherein said Sm—Fe—N based alloy powder has an average particle size of 0.7 to 4 $\mu$m and a particle shape having an average degree of needle shape of not less than 90%.

8. A process for producing a permanent magnet material comprising Sm—Fe—N based alloy powder, comprising:
    allowing a precipitate containing Sm and Fe to co-precipitate from a solution in which Sm and Fe are dissolved;
    calcining the precipitate to form a metal oxide;
    mixing the metal oxide with a metal reducing agent;
    reducing and diffusing the metal oxide mixed with the metal reducing agent into Sm—Fe alloy powder; and
    nitriding the Sm—Fe alloy powder to obtain said Sm—Fe—N based alloy powder,
    wherein said Sm—Fe—N based alloy powder has an average particle size of 0.6 to 10 $\mu$m, a particle shape having an average degree of needle shape of not less than 80%, a coercive force of not less than 12.5 kOe and a residual magnetization of not less than 100 emu/g.

9. The process for producing a permanent magnet material comprising Sm—Fe—N based alloy powder according to claim 8, wherein said Sm—Fe—N based alloy powder has an average particle size of 0.7 to 4 $\mu$m, a particle shape having an average degree of needle shape of not less than 85%, a coercive force of not less than 15 kOe and a residual magnetization of not less than 125 emu/g.

10. The process for producing a permanent magnet material comprising Sm—Fe—N based alloy powder according to claim 8, wherein said Sm—Fe—N based alloy powder has an average particle size of 0.7 to 4 $\mu$m, a particle shape having an average degree of needle shape of not less than 90%, a coercive force of not less than 17 kOe and a residual magnetization of not less than 130 emu/g.

11. The process for producing a permanent magnet material comprising Sm—Fe—N based alloy powder according to claim 1, wherein the metal reducing agent is metallic Ca or calcium hydride.

* * * * *

UNITED STATES PATENT AND TRADEMARK OFFICE
CERTIFICATE OF CORRECTION

PATENT NO. : 6,780,255 B2
DATED : August 24, 2004
INVENTOR(S) : Yoshiyuki Kawano et al.

It is certified that error appears in the above-identified patent and that said Letters Patent is hereby corrected as shown below:

<u>Title page,</u>
Item [75], Inventors, change "Yohsiyuki Kawano" to -- Yoshiyuki Kawano --.

Signed and Sealed this

Thirtieth Day of November, 2004

JON W. DUDAS
*Director of the United States Patent and Trademark Office*